United States Patent
Choi (10) Patent No.: US 11,077,745 B2
(45) Date of Patent: Aug. 3, 2021

(54) HIGH VOLTAGE BATTERY CARRIER FOR VEHICLE

(71) Applicants: HYUNDAI MOTOR COMPANY, Seoul (KR); KIA MOTORS CORPORATION, Seoul (KR)

(72) Inventor: Jae Young Choi, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 84 days.

(21) Appl. No.: 16/690,951

(22) Filed: Nov. 21, 2019

(65) Prior Publication Data
US 2021/0031608 A1   Feb. 4, 2021

(30) Foreign Application Priority Data
Jul. 30, 2019   (KR) .......................... 10-2019-0092383

(51) Int. Cl.
*B60K 1/04* (2019.01)
*B60L 50/60* (2019.01)
*H01M 50/20* (2021.01)

(52) U.S. Cl.
CPC ............... *B60K 1/04* (2013.01); *B60L 50/66* (2019.02); *H01M 50/20* (2021.01); *H01M 2220/20* (2013.01)

(58) Field of Classification Search
CPC ........... B60K 1/04; B60L 50/66; H01M 50/20
See application file for complete search history.

(56) References Cited

U.S. PATENT DOCUMENTS

| 3,708,028 | A  | * | 1/1973 | Hafer | B60L 53/80 180/65.1 |
| 6,571,542 | B1 | * | 6/2003 | Fillman | B60L 58/18 56/10.6 |
| 8,978,617 | B2 | * | 3/2015 | Matsuda | B60K 1/04 123/198 R |
| 9,499,205 | B1 | * | 11/2016 | Elia | B60K 1/04 |
| 9,688,314 | B2 | * | 6/2017 | Ajisaka | B60K 15/073 |
| 9,944,173 | B2 | * | 4/2018 | Ajisaka | B62D 25/20 |
| 10,214,100 | B2 | * | 2/2019 | Ajisaka | B60K 15/04 |
| 10,569,632 | B2 | * | 2/2020 | Toyota | B60K 6/26 |
| 2004/0035617 | A1 | * | 2/2004 | Chaney | B60L 50/66 180/65.1 |
| 2011/0025268 | A1 | * | 2/2011 | Davidovitch | B60L 53/80 320/109 |

FOREIGN PATENT DOCUMENTS

KR   10-2012-0033181 A   4/2012

* cited by examiner

*Primary Examiner* — John D Walters
*Assistant Examiner* — James J Triggs
(74) *Attorney, Agent, or Firm* — Brinks Gilson & Lione (57) ABSTRACT

A high voltage battery carrier for a vehicle includes: a main carrier coupled to a vehicle body frame and fixed to a high voltage battery; a subcarrier coupled to an upper portion or a lower portion of the main carrier and configured to form a space in which an electrical and electronic part is accommodated when coupled to the main carrier; and a detachable carrier which is vertically detachably installed on the subcarrier. The electrical and electronic part is coupled to the detachable carrier. With this arrangement, installation space can be reduced and workability is improved due to easy attachment and detachment of the electrical and electronic part.

15 Claims, 6 Drawing Sheets

FIG. 10

HIGH VOLTAGE BATTERY CARRIER FOR VEHICLE

CROSS REFERENCE TO RELATED APPLICATION

This application claims priority and the benefit of Korean Patent Application No. 10-2019-0092383, filed on Jul. 30, 2019, the entire contents of which are incorporated herein by reference.

FIELD

The present disclosure relates to a high voltage battery carrier for a vehicle, which is capable of improving workability.

BACKGROUND

The statements in this section merely provide background information related to the present disclosure and may not constitute prior art.

Recently, electric vehicles have developed to implement eco-friendly technologies and solve problems such as energy depletion and the like. The electric vehicles operate with motors which receive electricity from batteries and output power. Accordingly, the electric vehicles are considered as eco-friendly vehicles having advantages of no emission of carbon dioxide, very low noise, and high energy efficiencies of the motors which are higher than those of conventional engines.

Such eco-friendly vehicles are also being developed as electric buses. Since a plurality of high voltage batteries and a plurality of electrical and electronic parts are provided in large vehicles such as electric buses, more space is required to implement the plurality of high voltage batteries and the plurality of electrical and electronic parts.

Further, maintainability should be secured for the electrical and electronic parts. However, we have discovered that since the maintainability is not considered, there is a problem in that maintenance of the electrical and electronic parts is difficult.

The foregoing is intended merely to aid in the understanding of the background of the present disclosure, and is not intended to mean that the present disclosure falls within the purview of the related art that is already known to those skilled in the art.

SUMMARY

The present disclosure proposes a high voltage battery carrier for a vehicle, which is capable of improving workability when a high voltage battery and electrical and electronic parts are modularized to be mounted on a frame.

According to one aspect of the present disclosure, a high voltage battery carrier for a vehicle includes: a main carrier which is coupled to a vehicle body frame and to which a high voltage battery is fixed; a subcarrier which is coupled to an upper portion or a lower portion of the main carrier, forms a space in which an electrical and electronic part is accommodated when coupled to the main carrier, the subcarrier configured to be vertically opened; and a detachable carrier which is vertically detachably installed on the subcarrier and to which the electrical and electronic part is coupled.

In one form, the high voltage battery may be fixed to the upper portion of the main carrier, the subcarrier may be coupled to the lower portion of the main carrier, the detachable carrier may be inserted from a lower side of the subcarrier and coupled to the subcarrier such that the electrical and electronic part may be provided between the main carrier and the subcarrier.

In other form, the main carrier may include: a pair of first battery frames extending in a forward-backward direction, and a plurality of second battery frames disposed at intervals in the forward-backward direction and extending in an inward direction in which the pair of first battery frames face to each other.

Each of the pair of first battery frames and each of the plurality of second battery frames may have a closed cross section.

In another form, the vehicle body frame may include a pair of side frames extending in the forward-backward direction, a plurality of fixing brackets formed on the pair of side frames and protruding in the inward direction such that the plurality of fixing brackets face to each other and are spaced apart from each other. In one form, the pair of first battery frames may be disposed between the pair of side frames, and a coupler may be coupled to a corresponding fixing bracket among the plurality of fixing brackets through a fixing part.

The pair of first battery frames may be coupled to a plurality of support panels having a polygonal or circular cross section and configured to support the high voltage battery, and the plurality of support panels may be arranged along a longitudinal direction of the pair of first battery frames. In one form, the high voltage battery and the plurality of support panels may be coupled to each other through fixing parts.

In another aspect of the present disclosure, an engagement part is formed in a corresponding support panel among the plurality support panels and engaged with a corresponding fixing part among the fixing parts, and the engagement part extends vertically. In other form, a through-hole through which the engagement part passes may be formed in a corresponding first battery frame among the pair of first battery frames.

The subcarrier may include: a pair of first subframes extending along the forward-backward direction, one or more second subframes extending in the inward direction in which the pair of first subframes face to each other, and third subframes disposed at intervals along the forward-backward direction and extending toward the pair of first battery frames to be coupled thereto.

Each of the pair of first subframes, the one or more second subframes, and the third subframes may have a closed cross section, and a reinforcement rib may be formed at a connection portion of the pair of first subframes and the third subframes.

The pair of first battery frames may further include a bonding panel provided at a connection portion of the third subframes and configured to form a flat surface, and the bonding panel may be coupled to the pair of first battery frames and coupled to the third subframes through a fixing part.

A connector configured to vertically extend and engage with a fixing part may be formed in a bonding panel, and an opening hole through which the connector passes may be formed in the pair of first battery frames.

A plurality of detachable brackets protruding in a facing direction may be arranged with intervals on the pair of first subframes in the extension direction of the first subframe, and the detachable carrier may be inserted between the pair of first subframes and engaged with to be fixed to the plurality of detachable brackets.

The detachable carrier may be famed to form a polygon by connecting a plurality of detachable frames, and the plurality of detachable brackets and the plurality of detachable frames may be coupled through fixing parts.

A surface of the detachable frame, which is opposite to a surface to which the electrical and electronic part is fixed, may be formed to be open.

A plurality of detachable carriers may be provided, the electrical and electronic part may be fixed to one detachable carrier among the plurality of detachable carriers, and the plurality of detachable carriers may be disposed in a longitudinal direction of a first subframe to be fixed thereto.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a high voltage battery carrier for a vehicle according to exemplary embodiments of the present disclosure will be described with reference to the accompanying drawings.

Figure 1:
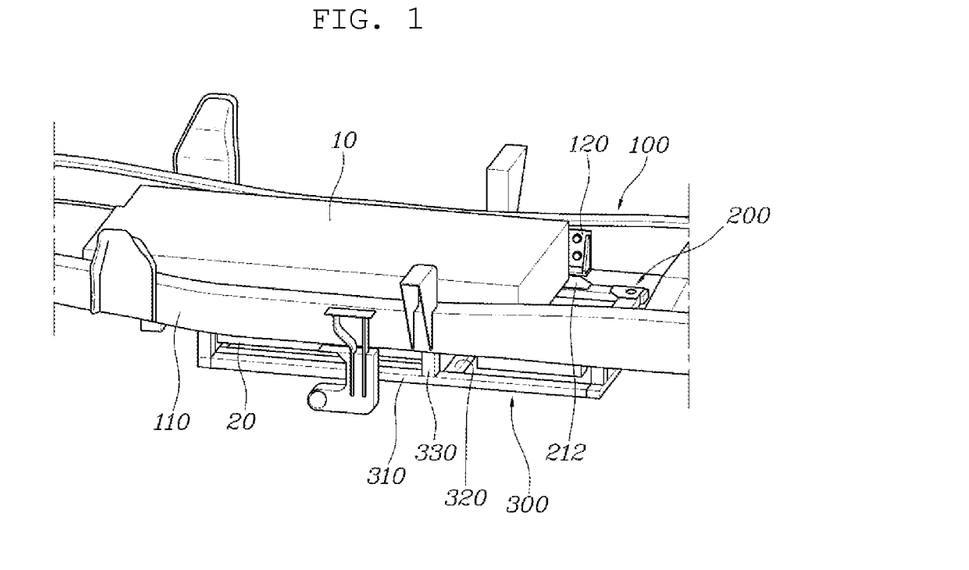
FIG. 1 is a perspective view illustrating a high voltage battery carrier for a vehicle according to one embodiment of the present disclosure.
Figure 2:
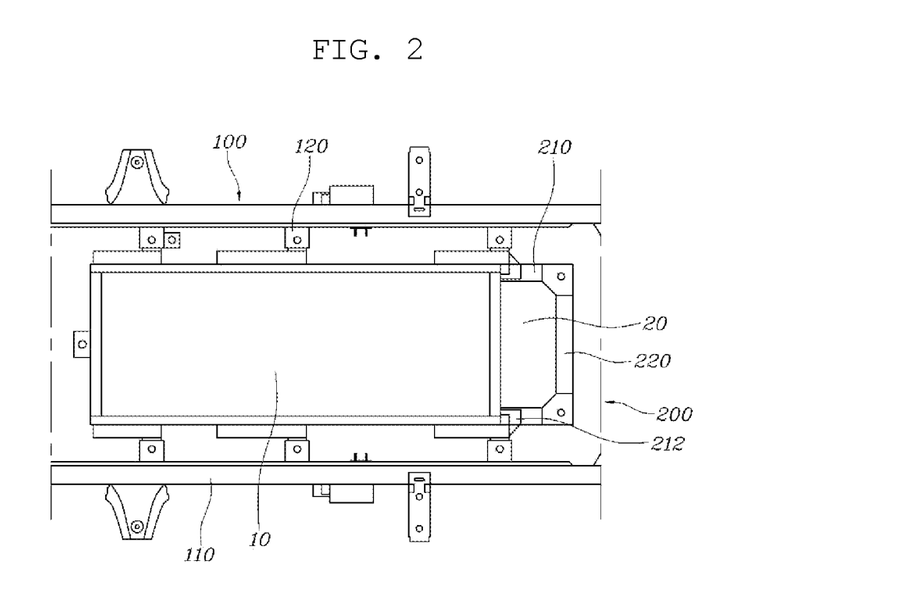
FIG. 2 is a plan view of the high voltage battery for a vehicle shown in FIG. 1.
Figure 3:
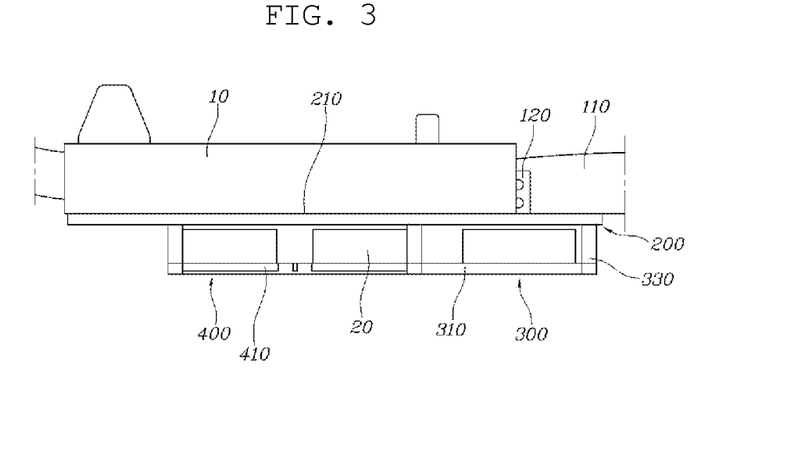
FIG. 3 is a side view of the high voltage battery for a vehicle shown in FIG. 1.
Figure 4:
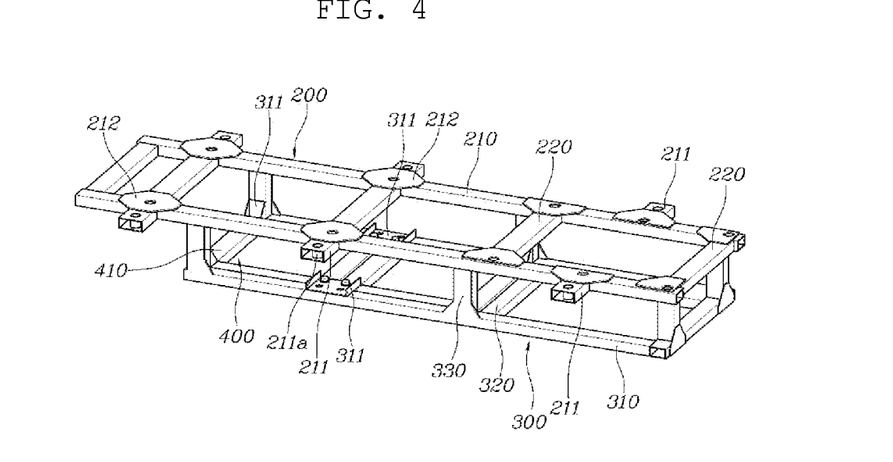
FIG. 4 is a diagram illustrating a main carrier, a subcarrier, and a detachable carrier of the high voltage battery for a vehicle shown in FIG. 1.
Figure 5:
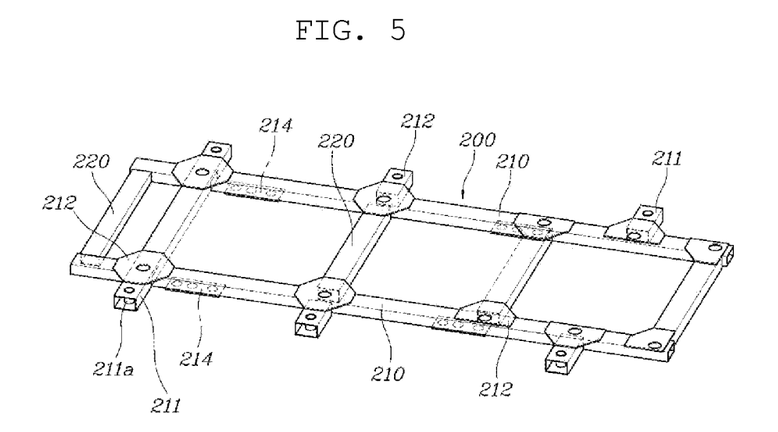
FIG. 5 is a diagram illustrating the main carrier of the high voltage battery for a vehicle shown in FIG. 1.
Figure 6:
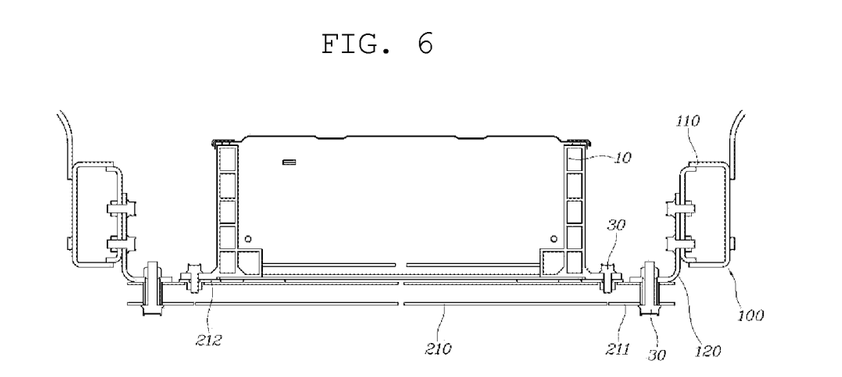
FIGS. 6 and 7 are diagrams for describing mounting of the main carrier of the high voltage battery for a vehicle shown in FIG. 1.
Figure 7:
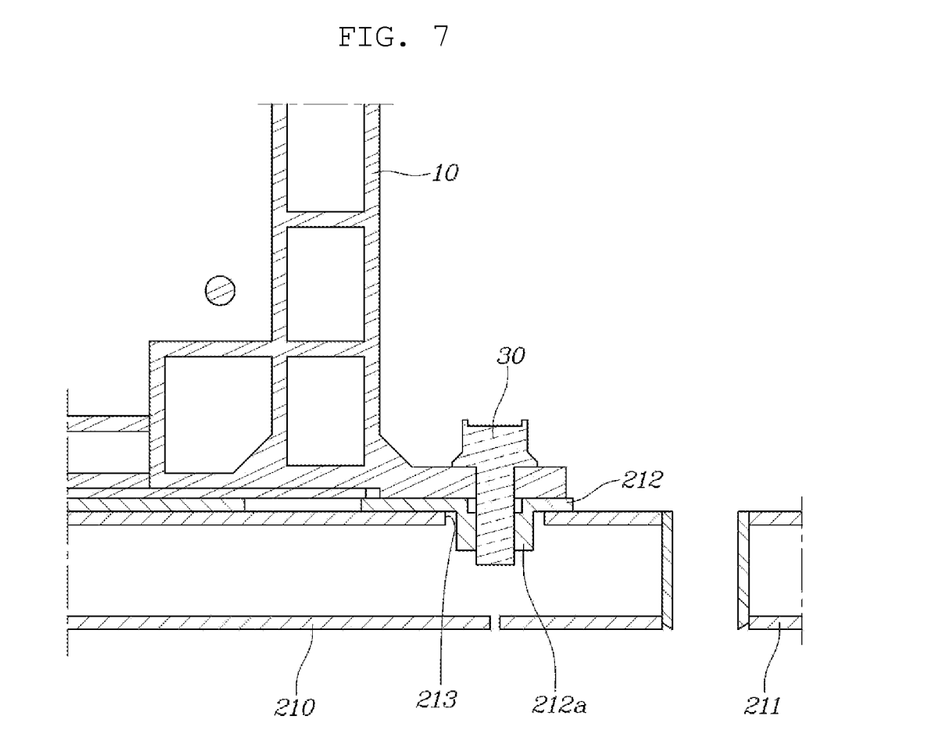
Figure 8:
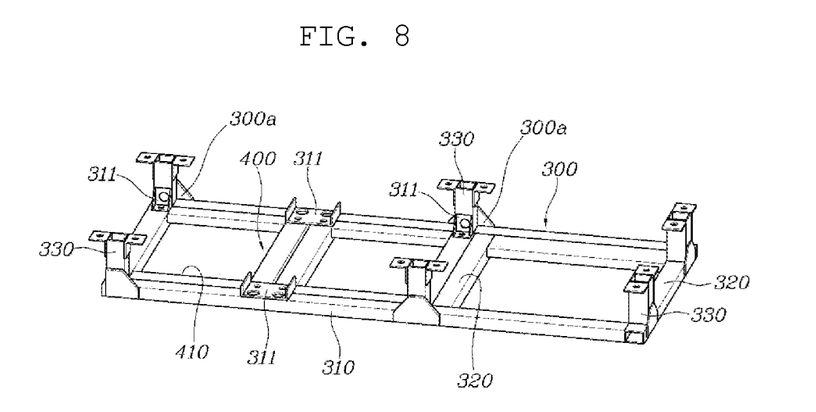
FIG. 8 is a diagram illustrating the subcarrier and the detachable carrier of the high voltage battery for a vehicle shown in FIG. 1.
Figure 9:
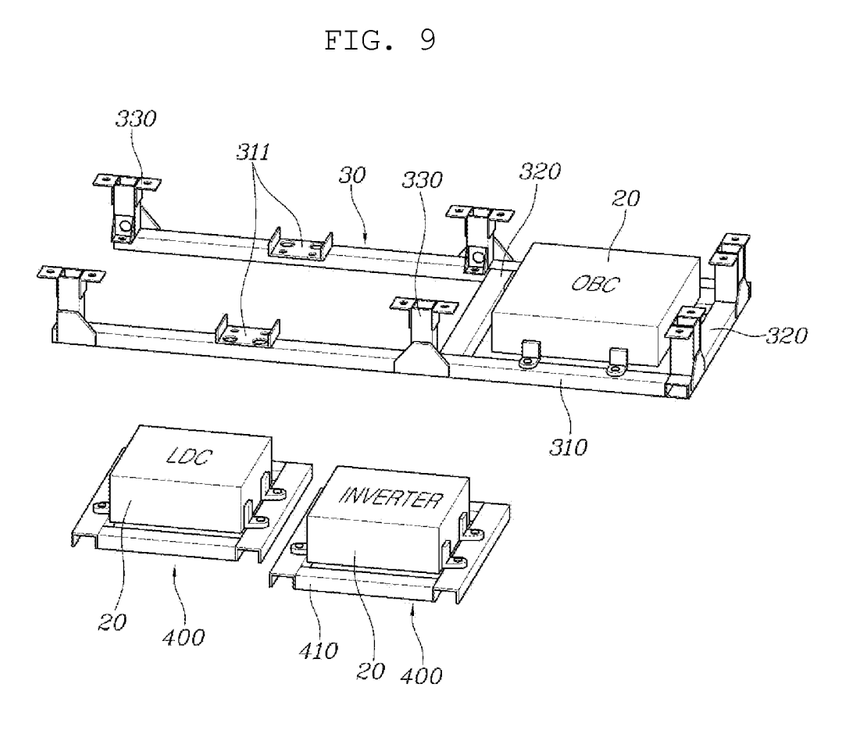
FIGS. 9 and 10 are diagrams for describing mounting of the subcarrier and the detachable carrier of the high voltage battery for a vehicle shown in FIG. 1.
Figure 10:
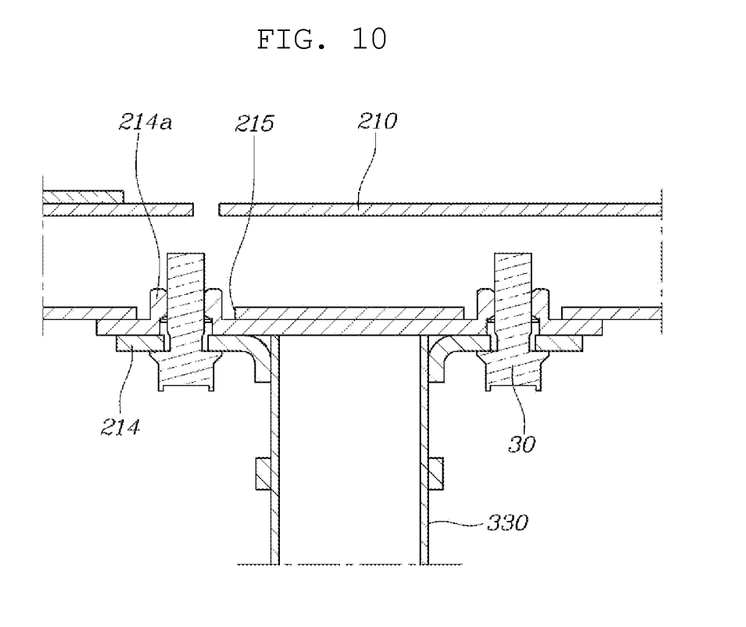

FIG. 1 is a perspective view illustrating a high voltage battery carrier for a vehicle according to one embodiment of the present disclosure, FIG. 2 is a plan view of the high voltage battery for a vehicle shown in FIG. 1, FIG. 3 is a side view of the high voltage battery for a vehicle shown in FIG. 1, FIG. 4 is a diagram illustrating a main carrier, a subcarrier, and a detachable carrier of the high voltage battery for a vehicle shown in FIG. 1, FIG. 5 is a diagram illustrating the main carrier of the high voltage battery for a vehicle shown in FIG. 1, FIGS. 6 and 7 are diagrams for describing mounting of the main carrier of the high voltage battery for a vehicle shown in FIG. 1, FIG. 8 is a diagram illustrating the subcarrier and the detachable carrier of the high voltage battery for a vehicle shown in FIG. 1, and FIGS. 9 and 10 are diagrams for describing mounting of the subcarrier and the detachable carrier of the high voltage battery for a vehicle shown in FIG. 1.

As shown in FIGS. 1 to 4, the high voltage battery carrier for a vehicle according to the present disclosure includes a main carrier 200 which is coupled to a vehicle body frame 100 and to which a high voltage battery 10 is fixed, a subcarrier 300 which is coupled to an upper portion or a lower portion of the main carrier 200 and, when coupled to the main carrier 200, forms a space in which an electrical and electronic part 20 is accommodated, and is formed to be vertically open, and a detachable carrier 400 which is detachably installed vertically in the subcarrier 300 and to which the electrical and electronic part 20 is coupled. The electrical and electronic part 20 may include various electronic devices desired in an electric or hybrid vehicle, such as a low voltage direct-current DC-DC converter (LDC), an inverter, an on-board charger (OBC), and the like.

The present disclosure includes the main carrier 200, the subcarrier 300, and the detachable carrier 400, and the main carrier 200 is coupled to the vehicle body frame 100. Here, the high voltage battery 10 is seated on and fixed to the main carrier 200, the electrical and electronic part 20 is seated on and fixed to the detachable carrier 400, and the detachable carrier 400 is detachably installed on the subcarrier 300 coupled to the main carrier 200. Consequently, when the electrical and electronic part 20 is serviced, the detachable carrier 400 is separated from the subcarrier 300 so that maintenance of the electrical and electronic part 20 may be performed.

As described above, in the present disclosure, the high voltage battery 10 and the electrical and electronic part 20 are fixed through the main carrier 200, the subcarrier 300, and the detachable carrier 400, and a structure is formed such that the high voltage battery 10 and the electrical and electronic part 20 are disposed in two stages on an upper side and a lower side of the vehicle body frame 100. Further, since the electrical and electronic part 20, which requires relatively frequent maintenance, is fixed to the detachable carrier 400, the detachable carrier 400 is separated from the subcarrier 300 to allow maintenance of the electrical and electronic part 20 such that maintainability is improved.

Meanwhile, the high voltage battery 10 is fixed to an upper portion of the main carrier 200, the subcarrier 300 is coupled to a lower portion of the main carrier 200, and the detachable carrier 400 is inserted below the subcarrier 300 and then coupled to the subcarrier 300. Thus, the electrical and electronic part 20 may be provided between the main carrier 200 and the subcarrier 300.

When the high voltage battery 10 and the electrical and electronic part 20 are applied to a large vehicle such as a large bus, the high voltage battery 10 and the electrical and electronic part 20 are installed in the vehicle body frame 100 at a lower side of the large vehicle so that the subcarrier 300 and the detachable carrier 400 are provided below the main carrier 200. That is, the high voltage battery 10 is fixed to the upper portion of the main carrier 200 and the subcarrier 300 is coupled to the lower portion of the main carrier 200 so that a space in which the electrical and electronic part 20 is provided is secured. The detachable carrier 400 to which the electrical and electronic part 20 is fixed is moved upward from a lower side of the subcarrier 300 to be coupled to the subcarrier 300.

As described above, since the high voltage battery 10 is fixed to the main carrier 200 and the electrical and electronic part 20 is fixed below the main carrier 200, the high voltage battery 10 and the electrical and electronic part 20 may be configured as a single module structure. Further, when maintenance of the electrical and electronic part 20 is required, the detachable carrier 400 is separated downward from the subcarrier 300 to allow the maintenance of the electrical and electronic part 20 to be performed such that maintainability is improved.

To describe the present disclosure in detail, as shown in FIG. 5, the main carrier 200 may include a pair of first battery frames 210 extending in a forward-backward direction, and a plurality of second battery frames 220 disposed to be spaced in a direction in which the first battery frame 210 extends and extending in an inward direction in which the first battery frames 210 face each other.

The first battery frame 210 and the second battery frame 220 may be famed in a closed cross section. Consequently, as cross-sectional coefficients of the first battery frame 210 and the second battery frame 220 increase, resistance thereof increases such that rigidity is secured.

As described above, the main carrier 200 is comprised of a pair of first battery frames 210 and a plurality of second battery frames 220. Since the pair of first battery frames 210 and the plurality of second battery frames 220 are vertically connected, quadrangular spaces may be formed between the pair of first battery frames 210 and the plurality of second battery frames 220. The main carrier 200 may be formed to have a cross section. However, since the spaces are formed between the pair of first battery frames 210 and the plurality of second battery frames 220, a total weight of the main carrier 200 is reduced and rigidity thereof is also secured.

Here, the number of the second battery frames 220 and a separation distance therebetween may be set according to rigidity desired for the main carrier 200.

Meanwhile, as shown in FIGS. 2 and 6, the vehicle body frame 100 may include: a pair of side frames 110 extending in the forward-backward direction; and a plurality of fixing brackets 120 which are formed on the pair of side frames 110 and protruding in an inward direction so as to face to each other and to be spaced apart from each other. The first battery frame 210 may be disposed between the side frames 110, a coupler 211 matching the fixing bracket 120 may be formed, the coupler 211 and the fixing bracket 120 may be coupled through a fixing part 30 such that the main carrier 200 may be fixed to the side frames 110 constituting the vehicle body frame 100.

As can be seen in FIG. 6, since the fixing bracket 120 is bent in the form of an "L" shape, the fixing bracket 120 may protrude from the side frame 110 to the main carrier 200. Since the coupler 211 extends from the first battery frame 210 to match the fixing bracket 120, the fixing part 30 vertically passes through the fixing bracket 120 and the coupler 211 to allow the fixing bracket 120 to be coupled to the coupler 211.

Here, the fixing part 30 may be comprised of a bolt, and a nut hole for bolt engagement may be formed in the fixing bracket 120 and the coupler 211. In order to allow the main carrier 200 to be separated downward from the vehicle body frame 100, the fixing part 30 may be engaged by being inserted from the lower side to the upward side of the vehicle body frame 100.

Further, a reinforcement collar 211*a*, which extends vertically, passes through the fixing part 30, and is made of a rigid material, may be provided in the coupler 211 to assist rigidity of the coupler 211.

Meanwhile, as shown in FIGS. 5 and 7, the first battery frame 210 further includes a support panel 212 which is formed to have a cross section of a polygonal or circular shape and on which the high voltage battery 10 is seated. The support panel 212 may be coupled to the first battery frame 210, and a plurality of support panels 212 may be provided in a length direction of the first battery frame 210, and the high voltage battery 10 and the support panel 212 may be coupled through the fixing part 30.

As described above, the support panel 212 on which the high voltage battery 10 is seated is provided in the first battery frame 210 and formed to have a predetermined cross-sectional area, thereby reinforcing rigidity of the main carrier 200 and stably supporting the high voltage battery 10 to be fixed.

Here, the plurality of support panels 212 are provided in the length direction of the first battery frame 210. The plurality of support panels 212 may be provided at positions at which the second battery frames 220 are connected and the couplers 211 are formed in the first battery frames 210, and more number of support panels 212 may be additionally provided according to desired rigidity.

An engagement part 212*a*, which extends vertically and with which the fixing part 30 is engaged, may be formed in the support panel 212, and a through-hole 213 through which the engagement part 212*a* passes may be formed in the first battery frame 210. Consequently, in a state in which the support panel 212 is coupled to the first battery frame 210, the engagement part 212*a* passes through the through-hole 213 to be inserted into the first battery frame 210 such that the support panel 212 may be tightly coupled to an upper portion of the first battery frame 210.

Here, the fixing part 30 may be comprised of a bolt, and a nut hole may be formed in the engagement part 212*a* such that the fixing part 30 may be bolt-engaged.

Meanwhile, as shown in FIG. 8, the subcarrier 300 may include a pair of first subframes 310 extending along the first battery frame 210 (i.e., the forward-backward direction), one or more second subframes 320 extending in a direction facing the first subframe 310 (i.e., the inward direction), and third subframes 330 disposed to be spaced in a direction in which the pair of first subframes 310 extend and extending toward the first battery frame 210 to be coupled thereto.

The first subframes 310, the second subframes 320, and the third subframes 330 are formed of a closed cross section and thus cross-sectional coefficients of the first subframe 310, the second subframe 320, and the third subframe 330 increase such that resistance increases to secure rigidity. A reinforcement rib 300*a* is formed at a connection portion of the first subframe 310 and the third subframe 330 such that rigidity of the connection portion of each subframe is increased.

As described above, the subcarrier 300 is comprised of the pair of first subframes 310 and a plurality of second subframes 320, and, since the pair of first subframes 310 are vertically connected to the plurality of second subframes 320, quadrangular spaces may be formed between the pair of first subframes 310 and the plurality of second subframes 320.

Here, the number of the second subframes 320 and a separation distance therebetween may be set according to rigidity desired for the subcarrier 300, and, in order to allow an electrical and electronic part 20 having a heaviest weight or relatively low maintenance necessity among the electrical and electronic parts 20 to be fixed, a connection shape of the first subframe 310 and the second subframe 320 may be determined. For example, as shown in FIG. 9, the OBC among the electrical and electronic parts 20 may be fixed to the subcarrier 300, and the second subframe 320 may connected to the first subframe 310 at a position at which the OBC is fixed such that rigidity may be secured.

Meanwhile, as shown in FIG. 10, the first battery frame 210 further includes a bonding panel 214 provided at the connection portion of the third subframe 330 and formed to form a flat surface. The bonding panel 214 may be coupled to the first battery frame 210 and coupled to the third subframe 330 through the fixing part 30.

As described above, the bonding panel 214 is provided in the first battery frame 210 at a portion at which the third subframe 330 of the subcarrier 300 is connected and is formed to have a predetermined cross-sectional area, thereby reinforcing rigidity at a connection portion of the first battery frame 210 and the third subframe 330.

Here, a connector 214a, which extends vertically and with which the fixing part 30 is engaged, may be formed in the bonding panel 214, and an opening hole 215 through which the connector 214a passes may be formed in the first battery frame 210. Consequently, the bonding panel 214 may be bonded to a lower portion of the first battery frame 210 in a state of being bonded to the first battery frame 210.

Here, the fixing part 30 may be comprised of a bolt, and a nut hole may be formed in the connector 214a such that the fixing part 30 may be bolt-engaged.

Meanwhile, as shown in FIGS. 8 and 9, a plurality of detachable brackets 311 protruding in a direction facing each other may be foiled in the first subframe 310 and spaced apart in an extension direction of the first subframe 310, and the detachable carrier 400 may be inserted between the first subframes 310 and engaged with and fixed to the plurality of detachable brackets 311.

As described above, the detachable bracket 311 protrudes from an upper portion of the first subframe 310 toward the detachable carrier 400 to match the detachable carrier 400 such that the detachable bracket 311 may be fixed to the subcarrier 300 through the fixing part 30. Here, in order to robustly fix the detachable carrier 400, the detachable carrier 400 may be engaged with and fixed to a plurality of detachable brackets 311, and connection points and the number of connections may be set so as to uniformly distribute a load according to a shape of the detachable carrier 400.

Here, the detachable carrier 400 may be formed to form a polygon by connecting a plurality of detachable frame 410, and the detachable brackets 311 and the detachable frames 410 may be coupled through the fixing parts 30. Here, a surface of the detachable frame 410, which is opposite a surface on which the electrical and electronic part 20 is fixed, is formed to be opened, thereby securing rigidity and reducing a weight.

In the present disclosure, since the main carrier 200 and the subcarrier 300 are formed in a quadrangular shape, the detachable carrier 400 may also be formed in a quadrangular shape by vertically connecting the plurality of detachable frames 410. Accordingly, the detachable carrier 400 may be fixed to the subcarrier 300 by connecting the detachable frames 410 to the detachable brackets 311 formed in the first subframe 310 through the fixing parts 30.

Here, the fixing part 30 may be comprised of a bolt, and a nut hole may be formed in an upper portion of the detachable frame 410 to be engaged with a bolt. In order to allow the detachable carrier 400 to be separated downward from the subcarrier 300, the fixing part 30 may be engaged by being inserted from a lower side to an upward side of the subcarrier 300.

Meanwhile, as shown in FIGS. 3 and 9, a plurality of detachable carriers 400 may be provided, the electrical and electronic part 20 may be fixed to any one among the plurality of detachable carriers 400, and the plurality of detachable carriers 400 are disposed in a length direction of the first subframe 310 to be fixed thereto.

As described above, the electrical and electronic part 20 is fixed to one among the detachable carriers 400. When a specific electrical and electronic part 20 is serviced in a state in which the detachable carriers 400 are fixed to the subcarrier 300, a corresponding detachable carrier 400 to which the specific electrical and electronic part 20 is fixed is separated from the subcarrier 300 to allow maintenance to be performed such that workability is improved.

As described above, when the electrical and electronic part is serviced, the detachable carriers 400 may be individually separated to a lower side such that maintainability is excellent and installation is also easy.

As described above, since the main carrier 200 and the subcarrier 300 are disposed on the upper side and the lower side, the high voltage battery 10 and the electrical and electronic part 20 are bound in two stages and modularized. When a specific electrical and electronic part 20 is serviced, a corresponding detachable carrier 400 to which the specific electrical and electronic part 20 is fixed is separated from the subcarrier 300 to allow maintenance to be performed such that workability is improved due to improved ease of attachment and detachment of the electrical and electronic part 20.

In accordance with a high voltage battery carrier for a vehicle, which is configured in the above described structure, a high voltage battery and an electrical and electronic part are modularized and bound to a vehicle body frame in two stages such that installation space can be reduced and workability is improved due to easy attachment and detachment of the electrical and electronic part.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

While the specific embodiments of the present disclosure have been described in detail, it is obvious to those skilled in the art that various modifications and alternations can be made without departing from the technical spirit and scope of the present disclosure and these modifications and alternations fall within the scope of the appended claims.

What is claimed is:

1. A high voltage battery carrier for a vehicle, comprising:
   a main carrier coupled to a vehicle body frame and fixed to a high voltage battery;
   a subcarrier coupled to an upper portion or a lower portion of the main carrier, and configured to form a space in which an electrical and electronic part is accommodated when coupled to the main carrier, the subcarrier configured to be vertically opened; and
   a detachable carrier which is vertically detachably installed on the subcarrier and to which the electrical and electronic part is coupled.

2. The high voltage battery carrier of claim 1, wherein:
   the high voltage battery is fixed to the upper portion of the main carrier, the subcarrier is coupled to the lower portion of the main carrier, and the detachable carrier is inserted from a lower side of the subcarrier and coupled to the subcarrier such that the electrical and electronic part is provided between the main carrier and the subcarrier.

3. The high voltage battery carrier of claim 1, wherein the main carrier includes:

a pair of first battery frames extending in a forward-backward direction; and a plurality of second battery frames disposed at intervals in the forward-backward direction and extending in an inward direction in which the pair of first battery frames face to each other.

4. The high voltage battery carrier of claim 3, wherein each of the pair of first battery frames and each of the plurality of second battery frames have a closed cross section.

5. The high voltage battery carrier of claim 3, wherein:

the vehicle body frame includes a pair of side frames extending in the forward-backward direction, and a plurality of fixing brackets formed on the pair of side frames and protruding in the inward direction such that the plurality of fixing brackets face to each other and are spaced apart from each other;

the pair of first battery frames is disposed between the pair of side frames; and a coupler is coupled to a corresponding fixing bracket among the plurality of fixing brackets via a fixing part.

6. The high voltage battery carrier of claim 3, wherein:

the pair of first battery frames are coupled to a plurality of support panels having a polygonal or circular cross section and configured to support the high voltage battery;

the plurality of support panels are arranged along a longitudinal direction of the pair of first battery frames; and the high voltage battery and the plurality of support panels are coupled to each other through fixing parts.

7. The high voltage battery carrier of claim 6, wherein:

an engagement part is formed in a corresponding support panel among the plurality support panels and engaged with a corresponding fixing part among the fixing parts, the engagement part extends vertically, and a through-hole through which the engagement part passes is formed in a corresponding first battery frame among the pair of first battery frames.

8. The high voltage battery carrier of claim 3, wherein the subcarrier includes:

a pair of first subframes extending along the forward-backward direction, one or more second subframes extending in the inward direction in which the pair of first subframes face to each other, and third subframes disposed at intervals along the forward-backward direction and extending toward the pair of first battery frames to be coupled thereto.

9. The high voltage battery carrier of claim 8, wherein:

each of the pair of first subframes, the one or more second subframes and the third subframes has a closed cross section; and a reinforcement rib is formed at a connection portion of the pair of first subframes and the third subframes.

10. The high voltage battery carrier of claim 8, wherein:

the pair of first battery frames further includes a bonding panel provided at a connection portion of the third subframes and configured to form a flat surface; and the bonding panel is coupled to the pair of first battery frames and coupled to the third subframes through a fixing part.

11. The high voltage battery carrier of claim 8, wherein:

a connector configured to vertically extend and engage with a fixing part is formed in a bonding panel; and an opening hole through which the connector passes is formed in the pair of first battery frames.

12. The high voltage battery carrier of claim 8, wherein:

a plurality of detachable brackets protruding in a facing direction are arranged with intervals on the pair of first subframes; and the detachable carrier is inserted between the pair of first subframes and engaged with to be fixed to the plurality of detachable brackets.

13. The high voltage battery carrier of claim 12, wherein:

the detachable carrier is configured to form a polygon by connecting a plurality of detachable frames; and the plurality of detachable brackets and the plurality of detachable frames are coupled through fixing parts.

14. The high voltage battery carrier of claim 12, wherein a surface of the plurality of detachable frames, which is opposite to a surface to which the electrical and electronic part is fixed, is formed to be open.

15. The high voltage battery carrier of claim 8, wherein:

a plurality of detachable carriers are provided, the electrical and electronic part is fixed to one detachable carrier among the plurality of detachable carriers, and the plurality of detachable carriers are disposed in a longitudinal direction of a first subframe to be fixed thereto.

* * * * *